United States Patent [19]

Lahos

[11] 4,143,464
[45] Mar. 13, 1979

[54] BICYCLE WHEEL ALIGNMENT INDICATING INSTRUMENT

[76] Inventor: Etienne Lahos, St. Benôit Labre, County of Beauce, Canada

[21] Appl. No.: 783,008

[22] Filed: Mar. 30, 1977

[51] Int. Cl.² .............................................. G01B 3/12
[52] U.S. Cl. ................................................. 33/203.16
[58] Field of Search ............ 33/203.18, 203.16, 203.19

[56] References Cited

U.S. PATENT DOCUMENTS 2,613,447  10/1952  Brouwer ........................... 33/203.16

FOREIGN PATENT DOCUMENTS

| | | | |
|---|---|---|---|
| 488002 | 12/1929 | Fed. Rep. of Germany ........ | 33/203.19 |
| 931948 | 11/1947 | France ................................... | 33/203.16 |
| 1229118 | 3/1960 | France ................................... | 33/203.16 |
| 281996 | 7/1928 | United Kingdom .................. | 33/203.16 |
| 609175 | 9/1948 | United Kingdom .................. | 33/203.16 |

Primary Examiner—William D. Martin, Jr.

[57] ABSTRACT

An instrument to indicate disalignment of a bicycle wheel or the like spoked wheel and characterized by a single feeler or guide engaging both the inner side and a lateral side of the rim, thus avoiding the need to remove the tire and connected to an indicating needle which indicates both the lateral and the circumferential disalignments in a convenient manner. This instrument includes a casing having a viewing window; the needle is pivotable in two orthogonal directions relative to the viewing window, and the latter is divided into four quadrant zones by lines extending parallel to the two orthogonal directions, and each quadrant zone is distinctive of one of the four modes to adjust the spokes of a wheel; tighten the left spoke, tighten the right spoke; release the left spoke; and release the right spoke.

2 Claims, 4 Drawing Figures

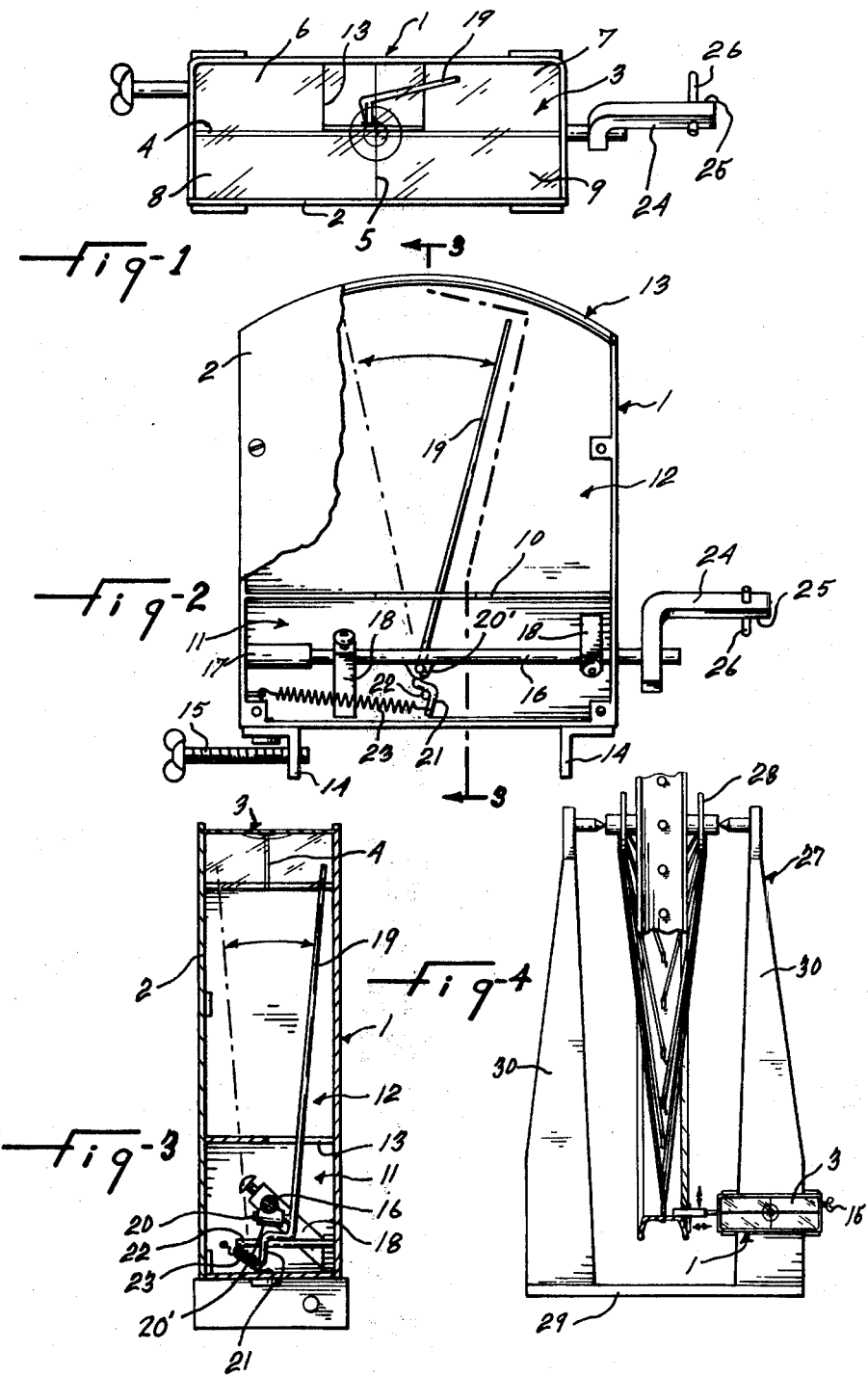

BICYCLE WHEEL ALIGNMENT INDICATING INSTRUMENT

This invention relates to an instrument of the type adapted to indicate the disalignment of a bicycle wheel or the like spoked wheel and thus allow proper alignment of the same wheel and corresponding rim.

With the present method and system of alignment of a bicycle wheel, the latter is placed on a stand and rotated relative to a pair of fixed guides. Such system is found disadvantageous due to the fact that the guides are fixed and that more than one guide is required. A fixed guide requires trial and error setting thereof for each wheel and this is duplicated, since two guides are required. Besides, one of the two guides engages the outer circumference of the rim and this requires the additional task of removing the tire from the rim and putting it back after alignment of the rim.

It is a general object of the present invention to provide a bicycle wheel alignment indicating instrument which avoids the above-mentioned disadvantages.

It is another general object of the present invention to provide a bicycle wheel alignment indicating instrument which uses only one guide or feeler to indicate both lateral and circumferential disalignments and requires no trial and error setting thereof.

It is a further general object of the present invention to provide a bicycle wheel alignment indicating instrument which does not require removal of the tire for its use and for alignment of the wheel and rim.

It is a more specific object of the present invention to provide a bicycle wheel alignment indicating instrument wherein the lateral and circumferential disalignments are indicated by a single indicating member.

It is another object of the present invention to provide a bicycle wheel alignment indicating instrument wherein the lateral and circumferential disalignments are indicated in a viewing window in which four quadrant zones readily indicate the four different and distinct modes to adjust the spokes of the wheel allowing alignment of the wheel, even by an untrained person.

The above and other objects and advantages of the present invention will be better understood with reference to the following detailed description of a preferred embodiment thereof, which is illustrated, by way of example, in the accompanying drawings, in which:

FIG. 1 is a front view of a bicycle wheel alignment indicating instrument according to the present invention;

FIG. 2 is a side view of the instrument of FIG. 1 with part of the side broken away;

FIG. 3 is a cross-sectional view as seen along line 3—3 in FIG. 2; and

FIG. 4 is a view of the same instrument operatively fixed to a support or stand in association with a bicycle wheel shown with part broken away.

The illustrated bicycle wheel alignment indicating instrument includes a body formed of a casing 1 provided with a removable side plate 2 allowing access therein. The front of the casing 1 is provided with a viewing window 3 which is made of a transparent material-like glass, plastic or the like. The viewing window 3 is arc-shaped in a predetermined direction corresponding to the longest transverse dimension of the casing 1. A pair of lines 4 and 5 extend orthogonally to each other on the viewing window to divide the latter into four quadrant zones 6, 7, 8, and 9, as shown in FIG. 1. The line 4 extends in the afore-mentioned direction of the longest transverse dimension while the line 5 extends in the direction of the shortest transverse dimension of the casing. A bull's eye is marked as a target at the center of convergence of the lines 4 and 5 and the four quadrant zones.

A partition 10 is fixed inside the casing 1 to divide the latter into a rear compartment 11 and a front compartment 12 which communicate with each other by a rectangular aperture 13 in this partition.

A pair of brackets 14 are fixed externally against the rear side of the casing and a clamp 15 is screwed in one bracket 14 to firmly clamp the instrument in operative position, as will be explained later in relation to FIG. 4.

A support in the form of a shaft 16 is mounted in a sleeve 17 and extends endwise through one side of the casing. The sleeve 17 is fixedly secured endwise against one internal face of the casing, such that the shaft 16 longitudinally extends parallel to line 4 of the window 3. The shaft 16 is rotatable about its axis and can also move back and forth endwise in the one direction defined by the line 4. A pair of oppositely inclined stoppers 18 are adjustably set on the shaft 16 to limit the rotation and endwise movements thereof. Stoppers 18 alternatively abut against the inner end of sleeve 17 and against the opposite side wall of casing 1 to determine the endwise limit positions of shaft 16. Stoppers 18 also alternatively abut against main side wall of casing 1 to determine the rotated limit positions of the shaft 16.

An indicating needle 19 includes a lateral projection 20 journalled in a sleeve 20' secured to the shaft 16 and having its rotation axis transverse to shaft 16, such that the needle pivots in the direction defined by the line 4 upon rotation of shaft 16 about its axis. The needle 19 can also pivot in sleeve 20' together with the shaft 16 in the other direction defined by the direction of the line 5. The needle 19 forwardly extends through the aperture 13 and has a forward painter end portion registering with the viewing window 3 and visible through the latter.

The indicating needle 19 has the opposite base end portion 21 which is crank-shaped and abuts against an abutment finger on rod 22 fixedly secured in the casing 1 and extending transversely of shaft 16 rearward of the latter. A tension spring 23 is connected to the crank-shaped end portion 21 of the needle 19 below abutment finger 22 and to an end wall of casing 1; spring 23 is inclined relative to shaft 16 (see FIG. 3) and biases needle base portion 21 toward abutment with the abutment finger 22, urges shaft 16 to its clockwise limit rotative position, as seen in FIG. 3, and also urges the shaft 16 to its advanced limit position protruding from casing 1, due to the lever action of crank-shaped end 21 using finger 22 as a fulcrum. Thus, the needle forward pointer end takes under the bias of spring 23 a limit position at the outer corner of quadrant zone 7. A feeler arm 24 is rigidly fixed to the outer end of the shaft 16 for bodily movement therewith. The feeler arm 24 includes an outer feeling portion 25 which is offset relative to the rotation axis of shaft 16 and is adapted to engage against the inner side of the rim of a bicycle wheel, and a lateral projection 26 secured to portion 25 inward of the outer end of the latter and adapted to engage one side of the rim, as shown in FIG. 4. The pointer portion of needle 19 is much longer than its base portion to amplify the movement of the feeler arm 24.

As shown in FIG. 4, the bicycle wheel alignment indicating instrument is adapted to be used in cooperation with a stand, such as stand 27, which rotatively supports the bicycle wheel 28. The stand 27 includes a base 29 and a pair of brackets 30 upwardly projecting from the base and laterally spaced apart and arranged to rotatably mount the bicycle wheel between them. The disalignment indicating instrument is fixed to one bracket 30 by the brackets 14 straddling the bracket 30 and the clamp 15 tightening the instrument to the bracket 30 in proper position so that the needle will register with the bull's eye target when the wheel rim has no radial and lateral deviations. The instrument then operatively engages the rim of the wheel 28 by means of the two elements 25 and 26, as afore-described in detail.

It may be easily understood that when the wheel rim has a lateral deviation, the projection 26 causes axial movement of shaft 16 and the indicating needle is pivoted; in the direction of line 4 on one side or the other of the instrument. The needle 19 then moves to one side of the line.

If the projection 25 senses radial deviation, the needle 19 pivots to one side or the other of the line 4. Thus, this tells that when the needle registers with any of the quadrant zones 6 to 8, which of the spoke or spokes to be tightened or released to center the needle with the bull's eye to obtain alignment of the wheel rim, both radially and laterally.

I claim:

1. An alignment indicating instrument for bicycle and the like wheels operating without having to remove a tire from said wheels, comprising a casing adapted to be mounted with one face adjacent the rim of a bicycle wheel mounted for rotation about its axle, said rim having a side edge and a radially inner surface with a portion adjacent said side edge free of any obstruction, a shaft mounted in said casing for axial and rotatable movement, said shaft having a portion protruding from said one face of said casing, a crank-shaped feeler arm secured to said protruding portion of said shaft and defining an outer feeler portion radially offset relative to the rotation axis of said shaft, a lateral feeler projection fixed to said feeler arm inward of said outer feeler portion and making a substantially right angle with the latter, said outer feeler portion engageable with said portion of said radially inner surface of said wheel rim, while said lateral feeler projection is simultaneously engageable with said side edge of said rim, whereby radial deviations of said wheel rim cause rotation of said shaft upon rotation of said wheel and lateral deviations of said wheel rim will cause axial movement of said shaft upon rotation of said wheel, an indicating needle pivotally connected to said shaft within said casing about an axis normal to said shaft for first pivotal movement of said needle about said axis relative to said shaft in a plane parallel to said shaft and for second pivotal movement in a plane transverse to said shaft upon rotation of said shaft, said needle having a longer pointer portion extending from its pivotal connection to said shaft towards a first free end of said needle and a shorter base portion extending from said pivotal connection towards the other free end of said needle, an abutment fixed to said casing and extending across said needle portion and against which said needle base portion abuts, whereby said needle effects its first pivotal movement upon longitudinal movement of said shaft, spring means attached to said needle base portion and to said casing and urging said needle base portion against said abutment and movement of said shaft to an advanced protruding limit position relative to said casing face, said spring means also urging rotation of said shaft in one direction towards a limit rotated position, said casing enclosing said needle and having a viewing window at one end, the outer end of said needle pointer portion extending close to said window and visible therethrough, said viewing window having a target mark thereon with which said outer end of said needle pointer portion is adapted to register for indicating alignment of said wheel rim, both radially and laterally, and stop means in said casing determining the limit advanced and rotated position of said shaft.

2. An instrument as claimed in claim 1, wherein said spring means is a single tension spring attached to said casing and to said needle base portion at a point of the latter beyond said abutment relative to the pivotal connection of said needle to said shaft, said spring making an acute angle with said shaft.

* * * * *